(12) United States Patent
Al-eisa

(10) Patent No.: US 11,537,599 B1
(45) Date of Patent: Dec. 27, 2022

(54) FAST DATABASE LOADING WITH TIME-STAMPED RECORDS

(71) Applicant: BMC Software, Inc., Houston, TX (US)

(72) Inventor: Eisa A. Al-eisa, Katy, TX (US)

(73) Assignee: BMC Software, Inc., Houston, TX (US)

( * ) Notice: Subject to any disclaimer, the term of this patent is extended or adjusted under 35 U.S.C. 154(b) by 0 days.

(21) Appl. No.: 17/449,550

(22) Filed: Sep. 30, 2021

(51) Int. Cl.
*G06F 16/23* (2019.01)
*G06F 16/22* (2019.01)
*G06F 16/25* (2019.01)

(52) U.S. Cl.
CPC ...... *G06F 16/2386* (2019.01); *G06F 16/2272* (2019.01); *G06F 16/2308* (2019.01); *G06F 16/2358* (2019.01); *G06F 16/258* (2019.01)

(58) Field of Classification Search
CPC .... G06F 16/2379–2386; G06F 16/2228–2272; G06F 16/23–2308; G06F 16/258; G06F 16/2358
See application file for complete search history.

(56) References Cited

U.S. PATENT DOCUMENTS

| | | | | |
|---|---|---|---|---|
| 8,214,707 B2 * | 7/2012 | Munson | ................. | H04L 1/1848 714/748 |
| 11,366,794 B1 * | 6/2022 | Saxena | ................... | G06F 16/22 |
| 11,368,560 B2 * | 6/2022 | Masputra | .............. | H04L 69/162 |
| 2009/0172674 A1 * | 7/2009 | Bobak | ................. | G06F 11/1482 718/101 |
| 2018/0181187 A1 * | 6/2018 | Chu | ...................... | G06F 1/3206 |
| 2019/0340168 A1 * | 11/2019 | Raman | .................. | G06F 16/258 |

OTHER PUBLICATIONS

IBM Documentation: "Clocks and time stamps," CICS Transaction Server for z/OS / 5.3, 2015, 2 pages, https://www.ibm.com/docs/en/cics-ts/5.3?topic=data-clocks-time-stamps.
S. Scudder: "The BMC LOADPLUS utility," Documentation for ALTER and BMC AMI Change Manaer for Db2 12.1, Aug. 17, 2020, 4 pages, https://docs.bmc.com/docs/alter-change/121/the-bmc-loadplus-utility-870715788.html.

* cited by examiner

*Primary Examiner* — James Trujillo
*Assistant Examiner* — Michal Bogacki
(74) *Attorney, Agent, or Firm* — Brake Hughes Bellermann LLP

(57) ABSTRACT

For a first record of a batch of records, a first timestamp may be determined to be stored with the first record in a database into which the batch of records are to be loaded as part of a database loading process. For each remaining record of the batch of records, a future timestamp may be generated using the first timestamp, until a final timestamp of a final record of the batch of records is generated. For a load completion time at which the database loading process completes, prior to the final timestamp, a wait time until a batch completion time may be determined by comparing the load completion time and the final timestamp, and waiting for the wait time to reach the batch completion time. If the load completion time is at or after the final timestamp, the batch completion time may be reached at the load completion time.

20 Claims, 4 Drawing Sheets

FAST DATABASE LOADING WITH TIME-STAMPED RECORDS

TECHNICAL FIELD

This description relates to database loading.

BACKGROUND

Database technology enables storage, analysis, and retrieval of vast amounts of data, including data sets of billions of individual data records. For example, database servers, database management systems, and database languages may be used to store records in a structured manner, insert or delete records, and query available records to retrieve desired information.

Many different types of computer software applications (applications) may utilize and benefit from such database technology. For example, applications across many different industries, such as ecommerce, finance (e.g., banking), network security, telecommunications, oil and gas, energy, government, education, manufacturing, or healthcare may all detect, generate, and/or store vast amounts of data that is particular to the context (e.g., industry) of each application. However, such applications do not have the tools and resources required to analyze or query the large quantities of resulting application data.

Therefore, a database management system may include, or be associated with, desired techniques for loading application data into a database, so as to provide the benefits of the database technology with respect to any type of application data that may be loaded. However, loading the application data in a desired manner is often a time-consuming, resource-intensive, and error-prone process.

SUMMARY

According to one general aspect, a computer program product may be tangibly embodied on a non-transitory computer-readable storage medium and may include instructions. When executed by at least one computing device, the instructions may be configured to cause the at least one computing device to determine, for a first record of a batch of records, a first timestamp to be stored with the first record in a database into which the batch of records are to be loaded as part of a database loading process, and generate, for each remaining record of the batch of records, a future timestamp using the first timestamp, until a final timestamp of a final record of the batch of records is generated. When executed by at least one computing device, the instructions may be configured to cause the at least one computing device to determine a load completion time at which the database loading process completes. Then, if the load completion time occurs prior to the final timestamp, the instructions may be configured to cause the at least one computing device to determine a wait time until a batch completion time by comparing the load completion time and the final timestamp, and wait for the wait time to reach the batch completion time. If the load completion time is at or after the final timestamp, the instructions may be configured to cause the at least one computing device to reach the batch completion time at the load completion time.

According to other general aspects, a computer-implemented method may perform the instructions of the computer program product. According to other general aspects, a system, such as a mainframe system or a distributed server system, may include at least one memory including instructions, and at least one processor that is operably coupled to the at least one memory and that is arranged and configured to execute instructions that, when executed, cause the at least one processor to perform the instructions of the computer program product and/or the operations of the computer-implemented method.

The details of one or more implementations are set forth in the accompanying drawings and the description below. Other features will be apparent from the description and drawings, and from the claims.

DETAILED DESCRIPTION

Figure 1:
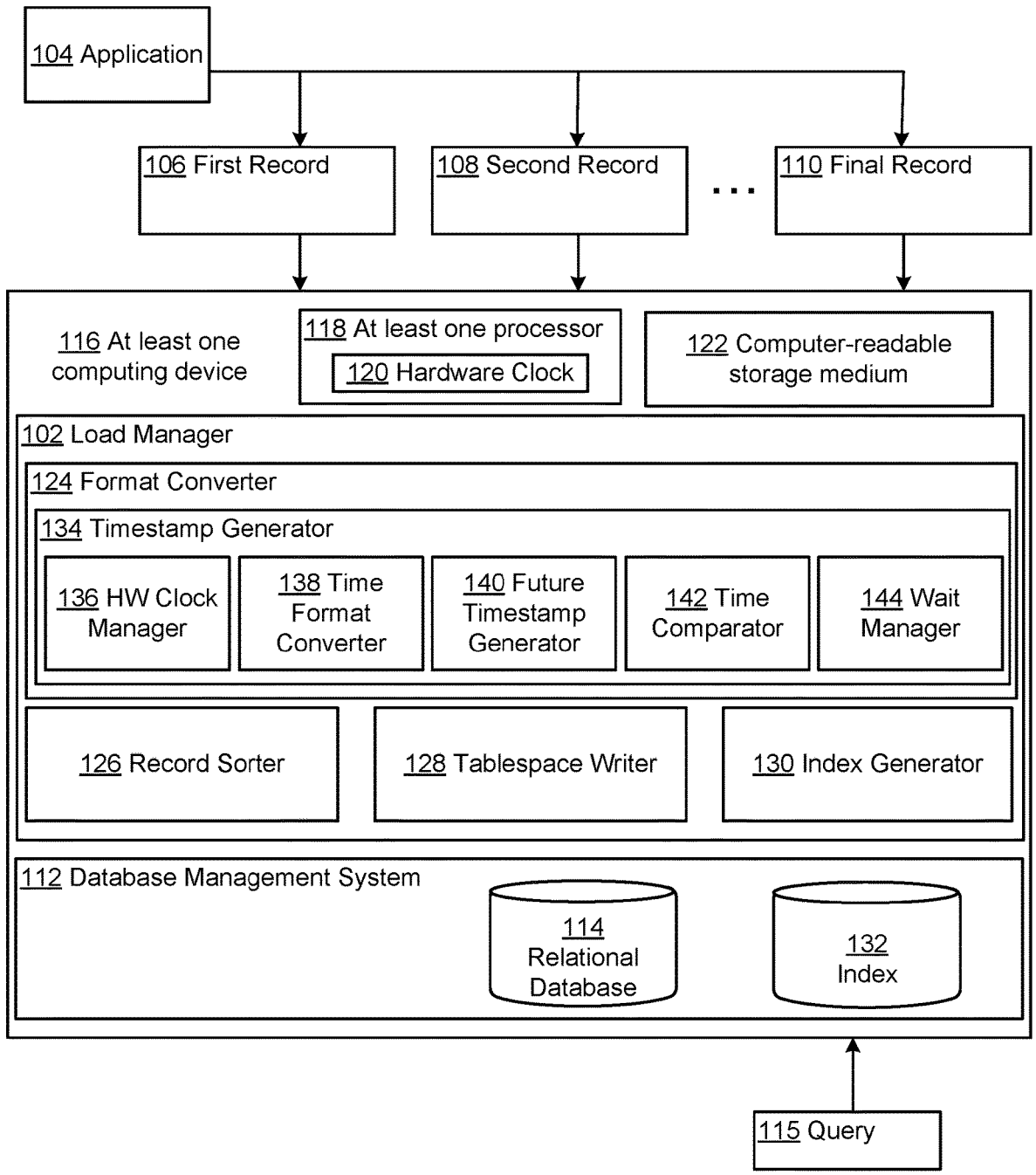
FIG. 1 is a block diagram of a system for fast database loading with timestamped records.

Described systems and techniques enable fast loading of large numbers of database records into a database, while generating a unique timestamp for each record. The unique timestamps may be stored in a timestamp field of a table(s) of the database in association with corresponding records. Accordingly, for example, such database-loading processes enable the use of such timestamps to maintain uniqueness, sequence, and cardinality of records. As a result, the timestamps may be used during and after loading to order, sort, index, query, characterize, and analyze data.

Conventional database management systems include techniques and capabilities for loading application data into database tables. Many such conventional techniques, however, are relatively slow and time-consuming. Moreover, as quantities of data to be loaded increase, e.g., into the billions of records to be loaded during a single loading process, delays associated with conventional loading processes become longer, more inconvenient, and more unacceptable.

Various load utilities and related techniques have been developed to increase a speed with which application data is loaded into a database. Such techniques may be implemented as batch processes, during which a source application of the application data is shut down during a batch window while the loading process executes. Such scenarios further emphasize a need for fast database loading, so that the batch windows may be as small as possible, and the underlying applications may be returned to an online status as quickly as possible.

In many cases, specific configurations and loading parameters may be specified that may slow or delay a loading process, and thereby lengthen a corresponding batch window and corresponding offline status while an application is loading data. For example, as referenced above and described in detail, below, it may be desirable to generate and store unique timestamps in conjunction with loaded data records.

Even if such additional operations impart only small quantities of processing delay and resource consumption for each record, the corresponding aggregate of such small quantities across many records (e.g., billions) is problematic. For example, applications that are considered to be mission critical should have as little downtime as possible, and, in general, it is often highly expensive, inconvenient, and undesirable for applications to be offline and unavailable when many customers, employees, and other users may have need of such applications.

Generating unique timestamps in these contexts, and with the above-referenced and other constraints, is non-trivial. For example, timestamp generation may rely on a hardware timer, counter, or clock, which may be operating at a particular speed or periodicity (e.g., in nanoseconds, or in smaller clock units). It is typically necessary, for example, to execute specific instructions and associated operations to obtain, convert, format, and otherwise utilize outputs of a hardware clock for timestamp generation. Such instructions and operations may be (in the aggregate) time-consuming and resource-intensive.

Thus, although it may be desirable for timestamps to be generated as quickly as possible, timestamp generation is also subject to other considerations and constraints, such as the types of processing just referenced with respect to obtaining and using a current time from a hardware clock. Moreover, other operations may be associated with the overall loading process, such as sorting records, writing the records to a tablespace of a database, and building an index for searching the loaded data, and it may be necessary to account for time required to execute each such operation when generating timestamps as described herein.

Further, a particular database loading process may be only one of two or more loading processes; that is, multiple batches of records may need to be loaded over time. Therefore, and to the extent that generated timestamps are required to be unique to be used in a corresponding index, it may be required to ensure that a first loading process (first batch) fully completes prior to initiating a second loading process (second batch), so as to ensure that no duplicate timestamps are generated across the database as a whole.

Accordingly, as described in detail herein, a database loading process may be conducted in which interactions with a hardware clock (and associated operations and delays) are minimized, and timestamps for records being loaded are automatically generated with future time values, without waiting to receive those timestamp values from a hardware clock when the actual time values are reached. In this way, the timestamp generation process may occur quickly and with minimal use of resources.

As the timestamps may be generated and assigned to individual records much more quickly than in conventional techniques, it may occur that remaining operations of the database loading process being executed reach completion prior to a final timestamp of the generated timestamps being reached. Then, as referenced above, it may be necessary to wait before finalizing the batch of records being loaded and restarting an associated application from which the records are obtained. In this way, generation of duplicate timestamp values across multiple batches of records may be avoided.

FIG. 1 is a block diagram of a system for fast database loading with timestamped records. In the example of FIG. 1, a load manager 102 is configured to load, from an application 104, a first record 106, a second record 108, and a final record 110. For simplicity and ease of explanation, the example of FIG. 1 explicitly illustrates only the three records 106, 108, 110, but the final record 110 should be understood to represent the $n^{th}$ record of a set of n records, so that the records 106, 108 . . . 110 represent a large set of records that may number, for example, in the billions.

As referenced above, and described in detail, below, the application 104 may represent any application that may benefit from having the associated records 106, 108, 110 stored for later retrieval and analysis. For example, the application 104 may represent one or more applications used by businesses, such as ecommerce, finance (e.g., banking), network security, telecommunications, oil and gas, energy, manufacturing, or entities in other industries, or entities such as government, education, or healthcare entities (entities). The application 104 may thus, for example, provide core functions of those entities, such as executing transactions with customers of those entities or other users of the applications (e.g., employees), producing goods for sale, or maintaining patient histories.

Therefore, the application 104 may produce the records 106, 108, 110 over a period of time and/or in response to underlying events associated with execution of the application 104. Over comparatively longer periods of time, then, the records 106, 108, 110 should be understood to represent a single set or batch of a plurality of sets of data records that may be produced by the application 104.

The records 106, 108, 110 should thus be understood to represent any file, document, message, event, or other data that may be generated or recorded by the application 104. For example, the records 106, 108, 110 may represent e.g., record information regarding individual customer transactions, telecommunication services, oil and gas or energy or manufacturing production units, manufacturing operations, student education records, government records, patient histories, or any hardware or software operations related to operations of the application 104.

In example implementations, the records 106, 108, 110 may be produced in an inherent order, e.g., may be inherently sequential, because the records 106, 108, 110 reflect or memorialize ordered or sequential operations of the application 104. For example, as referenced, many businesses and other entities generate data that reflects, or results from, ongoing operations.

In these and similar contexts, many different types of data logging may occur, which generally refers to the capture, collection, and storage of data over time, as associated events occur with respect to underlying hardware and software components and information technology (IT) operations. Traditional data logging may refer to capturing, in an automated manner, operations of the hardware and software components for which the data logging is performed, to enable identification, analysis, and correction of system malfunctions, or optimization of various system functions.

Similarly, ongoing business or other activities of the application 104 may be captured and recorded in the records 106, 108, 110 as pseudo log data, in that the data has some inherent order and memorializes the ordered data for future analysis, and even if the captured data is of a type that may not traditionally be considered to be log data. For example, the records 106, 108, 110 may capture and memorialize manufactured products or employee activities.

Further in FIG. 1, a database management system (DBMS) 112 includes a relational database 114, into which the records 106, 108, 110 may be loaded by the load manager 102. The DBMS 112 may represent any suitable or future system for managing the relational database 114 and related functionalities. As such, specific features and aspects of the DBMS 112 are not described in detail, except as may be necessary or helpful to understand operations of the load manager 102.

Moreover, the DBMS 112 should be understood to be executable by any suitable computing platform. For purposes of illustration and example, FIG. 1 shows that the DBMS 112, as well as the load manager 102, may be executed using at least one computing device 116. The at least one computing device 116 may include at least one processor 118, which may itself include a hardware clock 120. The at least one computing device 116 is also illustrated as including a non-transitory computer-readable storage medium 122. That is, the non-transitory computer-readable storage medium 122 may store instructions that, when executed by the at least one processor 118, cause the at least one computing device 116 to provide the functionalities of the load manager 102 and the DBMS 112.

For example, the at least one computing device 116 may represent one or more servers. For example, the at least one computing device 116 may be implemented as two or more computing devices in communications with one another over a network. Accordingly, the load manager 102 (or individual components, modules, or portions thereof) may be implemented using separate devices in communication with one another.

The hardware clock 120 should be understood to represent any counter or timer that may be used by the at least one processor 118 to perform functions of the at least one processor 118. Examples of techniques for implementing the hardware clock 120 are well known, and are not described here in detail, except as may be necessary or helpful in understanding operations of the load manager 102 or the DBMS 112. In general, the hardware clock 120 of the at least one processor 118 may be used, for example, to synchronize and schedule operations of the at least one processor 118, such as operations for performing instructions stored using the computer-readable storage medium 122. Further, additional uses of the hardware clock 120 by the load manager 102 are described in detail, below.

The at least one computing device 116 enables the DBMS 112 to provide capabilities for storing, modifying, retrieving, and analyzing data (including, e.g., log data and pseudo log data, as referenced above) within the relational database 114. For example, the DBMS 112 may be configured to receive a query 115 from an end user and provide a query response to the end user with specified data from the relational database 114. The DBMS 112 may provide various other related functionalities, such as user interfaces, user profile administration, security, resiliency, and various other logistical aspects of data management. For example, the DBMS 112 may represent the Db2 system of IBM.

As just referenced, one function of the DBMS 112 may be to load data into the relational database 114. For example, the DBMS 112 may include built-in functionality for inserting new records into the relational database 114, including the records 106, 108, 110.

Such built-in functionality may be designed to maintain a consistency and correctness of query responses across many instances of the query 115, notwithstanding changes being made to the relational database 114 to reflect ongoing operations of the application 104. For example, the DBMS 112 may be configured to avoid conflicts between updates to data records and queries against the same data records.

Consequently, built-in capabilities for inserting new records into the relational database 114 using the DBMS 112 may be slowed by the types of consistency and conflict management just referenced. For extremely large quantities of records to be loaded, the resulting loading processes may occur over one or more days before reaching completion.

The load manager 102 may thus represent a separate utility for loading data into the relational database 114 in a fast and efficient manner, e.g., in a time period on the scale of individual hours, even for very large data sets being loaded. To resolve the types of consistency and conflict issues referenced above, the load manager 102 may cause the application 104 to be temporarily shut down or halted while a specific loading process occurs. However, since such a loading process may occur many times faster than built-in loading techniques of the DBMS 112, the load manager 102 provides a loading option that may be highly preferable for many use cases of the DBMS 112.

The load manager 102 may include multiple features and functions related to loading the records 106, 108, 110 into the relational database 114. For example, the load manager 102 may include a format converter 124 that is configured to update a format (and, if needed, related content) of each record being loaded. For example, the records 106, 108, 110 may include the same or similar data or types of data, but formatted differently. In other examples, described in detail, below, the records 106, 108, 110 may be modified to include unique timestamps.

A record sorter 126 may be configured to sort the records 106, 108, 110 in one or more various ways. For example, loaded records may be sorted in ascending or descending order, and based on one or more fields and associated values (included timestamps and timestamp values).

A tablespace writer 128 may be configured to write the formatted, sorted records into one or more tables of the relational database 114, within an assigned tablespace. An index generator 130 may be configured to generate one or more indexes, shown in FIG. 1 as an index 132, corresponding to the loaded data and facilitating fast and efficient searches in response to the query 115.

Thus, the format converter 124, the record sorter 126, the tablespace writer 128, and the index generator 130 may be understood to perform various functions related to preparing and loading data (represented by the records 106, 108, 110) into the relational database 114, while also constructing the index 132. Such pre-loading and/or loading functions are not intended to be an exhaustive list. Rather, various other functions may be performed by the load manager 102 that are not explicitly described here, such as verifying correctness of data, or compressing or decompressing data.

Further, it will be appreciated that many of the functions of the format converter 124, the record sorter 126, the tablespace writer 128, and the index generator 130 may duplicate or facilitate similar native functions of the DBMS 112. However, as described, the load manager 102 is configured to provide these functions in the context of providing an extremely fast and efficient loading process. In particular, the load manager 102 is configured to execute such a loading process while simultaneously generating and utilizing a unique timestamp for each loaded record.

For example, the format converter 124 is illustrated as including a timestamp generator 134. As referenced above, the timestamp generator 134 may be configured to provide a unique timestamp for each record of the records 106, 108, 110, in a fast and efficient manner, while allowing the generated timestamps to be used in subsequent operations of the load manager 102, such as sorting operations of the record sorter 126, or indexing operations of the index generator 130.

For example, the timestamp generator 134 may enable addition of timestamps within a corresponding field or column of a database table of the relational database 114. For example, within one or more tables, a field or column may be included such as, "time of execution", "time of insertion", "time of creation," or "timestamp." Then, the timestamp generator 134 may generate a timestamp for each record being loaded, and the resulting timestamps may be included within the corresponding field(s) of corresponding row(s) of each record.

To add timestamps, it is possible to utilize the hardware clock 120 of the at least one processor 118. As referenced above, the hardware clock 120 may provide timer or counter functionalities at a defined interval. As the hardware clock 120 is used to govern operations of the at least one processor 118, which are generally designed to be able to execute as quickly as possible, the defined interval may be very small. For example, the hardware clock 120 may provide a count at each nanosecond, or at smaller clock units.

The count of the hardware clock 120 may be distinguished from, but related to, a standard time of day representation, which may include a year, month, day, hour, minute, second, and portions of seconds (e.g., milliseconds, or microseconds). The time of day may also be referred to, for example, as wall clock time, elapsed time, or calendar time.

Various techniques are known, or may be devised, to relate the counter of the hardware clock 120 to a time-of-day representation. For example, as described in more detail, below, with respect to FIG. 3, a reference date and time may be used, such as Jan. 1, 1900, and current counts may be related to the reference date to determine a current date and time.

However, relating or converting the counts of the hardware clock 120 to a current wall-clock time requires conversion operations of the at least one processor to be executed. Such conversion operations consume resources of the at least one processor 118.

For example, such conversion operations must convert binary representations of a currently-stored time of day to human-readable representations, in a consistent format. The conversion operations therefore include multiplication, addition, and division operations, all of which require time and resources of the at least one processor 118.

Thus, it is not feasible to execute such conversion operations as quickly as the counter of the hardware clock 120, since the conversion operations themselves are governed by the counter, and multiple operations (cycles) of the at least one processor 118 (and related hardware of the at least one computing device 116) must be completed to calculate each output of wall-clock time in a human-readable format.

Therefore, a timestamp interval may be selected that is larger than the counter interval of the at least one processor 118. That is, a difference in time between consecutive timestamps, such as between a timestamp of the record 106 and a timestamp of the record 108, may be set at a defined interval, referred to herein as a timestamp interval. For example, a timestamp interval of 1 microsecond may be selected.

Conventional techniques exist for assigning timestamps at a timestamp interval that is larger than a counter interval of the at least one processor 118. For example, it is possible to assign a first timestamp to the first record 106 by issuing a command to the at least one processor 118 to convert and store a value of the hardware clock 120, such as the "store clock" (STCK) command or similar. Then, it is possible to continually issue subsequent store clock commands until a value is reached that is 1 microsecond larger than the first timestamp, which value may then be converted and stored as a second timestamp for the second record 108.

In other conventional techniques, it is possible to assign a first timestamp to the first record 106 by issuing a command to the at least one processor 118 to convert and store a value of the hardware clock 120, as just referenced, and then waiting for 1 microsecond before issuing a second command to convert and store a second value as a second timestamp for the second record 108.

Both of the above approaches, and other conventional techniques, are wasteful and inefficient, and consume time that adds to an overall time during which the application 104 is shut down. In particular, in both examples, a large portion of intervening times between assigned timestamps is spent without taking any actions towards the goal of loading the records 106, 108, 110 into the relational database 114. Instead, the intervening times are spent either continuously calculating and checking current times until the timestamp interval is reached, or simply waiting until the timestamp interval is reached.

In contrast, the timestamp generator 134 of FIG. 1 may be configured to calculate and assign timestamps for all of the records 106, 108, 110 early in a loading process of the load manager 102 and prior to the times corresponding to the timestamps actually being reached. In other words, the timestamp generator 134 may be configured to generate and store timestamps for future times or time values that have not yet been reached in real time at the time of generation.

The resulting timestamps are thus available early in a loading process, with minimal waiting, and with an efficient use of resources. Further, the timestamps may be used to facilitate and enhance subsequent operations of the load manager 102, such as sorting operations of the record sorter 126, or index generation operations of the index generator 130.

For example, the timestamp generator 134 may include a hardware (HW) clock manager 136 that is configured to obtain a current time of day, e.g., by issuing a STCK command to the hardware clock 120. Such a command may be issued to determine a first timestamp to be stored in conjunction with the first record 106.

Then, a time format converter 138 may proceed to convert the obtained time of day into a human-readable format. Any suitable time of day representation may be used that adequately represents a granularity of a desired timestamp interval (e.g., to microsecond).

In contrast to conventional techniques, operations of the HW clock manager 136 and the time format converter 138 may be performed as little as one time for a loading operation for loading all of the batch of records 106, 108, 110. Then, a future timestamp generator 140 may be configured to calculate and assign all subsequent, remaining timestamps for remaining records 108, 110, based on the calculations performed with respect to the record 106.

For example, the future timestamp generator 140 may input the first timestamp of the first record 106 and generate a second timestamp that is 1 microsecond later for assignment to the second record 108. The future timestamp generator 140 may then proceed to calculate and assign subsequent timestamps at 1 microsecond intervals, until a final ($n^{th}$) timestamp is calculated that corresponds to the final ($n^{th}$) record 110.

In this way, an entire set of n timestamps may be determined and assigned extremely quickly, without additional interactions with, or waiting for, the hardware clock 120. Minimizing such interactions with the hardware clock 120 also preserves resources of the at least one processor 118 because the set of n timestamps may be obtained using computations that are far less resource-intensive than those required by repetitively using the HW clock manager 136 and the time format converter 138 to obtain timestamps.

As a result, in many cases, the set of n timestamps for n records may be obtained so quickly that the load manager 102 may complete remaining load operations (such as operations of the record sorter 126, the tablespace writer 128, and/or the index generator 130) for the batch of records 106, 108, 110, prior to a time that corresponds to the final timestamp of the final record 110. In other words, a load completion time refers to a time at which all n records of the records 106, 108, 110 have been sorted, written, indexed, and otherwise processed and stored within the DBMS 112. A batch completion time, as used herein, refers to a time at which processing of the entire batch of records 106, 108, 110 completes and the load manager 102 is authorized and enabled to proceed with a subsequent loading of a subsequent batch of records.

In conventional systems, timestamps are issued in real time as the loading operations proceed, and many loading operations (e.g., sorting or indexing) require use of the timestamps to complete. Therefore, the load completion time and the batch completion time are the same, or substantially the same, as one another, and both the load completion time and the batch completion time are reached at about the same time, or later than, a time value of a final timestamp.

In contrast, in FIG. 1, all n timestamps may be generated and assigned before the load completion time is reached. Therefore, a time comparator 142 may be configured to determine a final time value of the final timestamp of the final record 110, and then compare the final time value against the load completion time, when the load completion time is reached. If the final timestamp value is later than a time value of the load completion time, then a wait manager 144 may be configured to pause or delay the batch completion time of the load manager 102 for the batch of records 106, 108, 110 until the final time value of the final timestamp is reached.

On the other hand, if the time comparator 142 determines that the load completion time value reaches a final time value of the final timestamp, then no further wait is required and the batch completion time may occur immediately. In other words, once such a determination is made, the time comparator 142 may authorize or enable completion of the batch loading operation of the records 106, 108, 110 as soon as the load completion time is reached.

By ensuring that the final time value of the final timestamp is reached prior to determining the batch completion time, the load manager 102 ensures that the batch of records 106, 108, 110 are processed prior to any subsequent batch of records being loaded and otherwise processed. In this way, FIG. 1 illustrates that it is possible to ensure inter-batch uniqueness of timestamps among records of multiple batches.

For example, in FIG. 1, a first batch of records may be assigned timestamp values spanning a first interval (from a first timestamp of the first batch to a final timestamp of the first batch), while a second batch of records may be ensured to have timestamp values spanning a second interval (from a first timestamp of the second batch to a final timestamp of the second batch) that does not overlap the first interval. Therefore, all timestamps of multiple batches will be unique among all of the batches of records, and no duplicate timestamps will be included.

As a result, for example, proper indexing of all records of all batches of records may be ensured. For example, the index 132 may be used to index multiple batches of records, all stored in the relational database 114. Then, the query 115 may be issued against all included records, originating from multiple batches of records loaded, and all records corresponding to the query 115 may be accurately returned in a query response.

Figure 2:
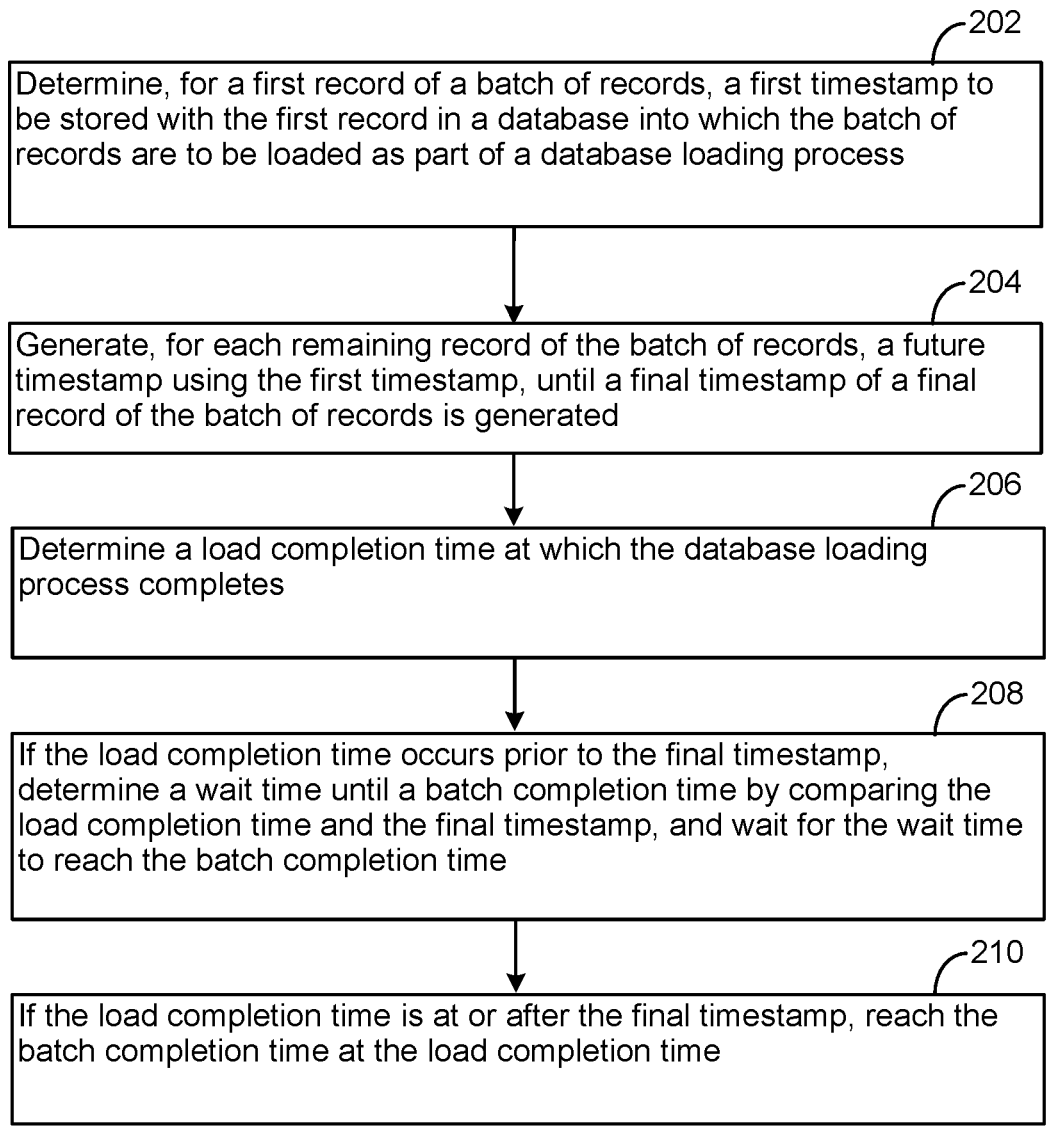
FIG. 2 is a flowchart illustrating example operations of the system of FIG. 1.

FIG. 2 is a flowchart illustrating example operations of the system of FIG. 1. In the example of FIG. 2, operations 202-210 are illustrated as separate, sequential operations. In various implementations, the operations 202-210 may include sub-operations, may be performed in a different order, may include alternative or additional operations, or may omit one or more operations. Further, in all such implementations, included operations may be performed in an iterative, looped, nested, or branched fashion (as illustrated, for example, in the flowcharts of FIGS. 3 and 4).

In FIG. 2, for a first record of a batch of records, a first timestamp may be determined to be stored with the first record in a database into which the batch of records are to be loaded as part of a database loading process (202). For example, as part of a loading process for loading a batch of records 106, 108, 110 into the relational database 114, and in conjunction with temporarily shutting down the application 104 to conduct the database loading process, the timestamp generator 134 may identify the first record 106 as a first record of the batch. The HW clock manager 136 and the time format converter 138 may then obtain and convert a current time from the hardware clock 120, to thereby obtain the first timestamp.

For each remaining record of the batch of records, a future timestamp may be generated using the first timestamp, until a final timestamp of a final record of the batch of records is generated (204), e.g., by the future timestamp generator 140. For example, if a timestamp for the first record 106 is obtained as just referenced, and represented here as $TS_1$, then a second timestamp for the second record 108 may be obtained by incrementing the time of $TS_1$ by a defined timestamp interval, such as 1 microsecond. Then, $TS_2$ may be determined as $TS_1+1$ microsecond. This process may continue by incrementing each consecutive timestamp by the timestamp interval to obtain a subsequent timestamp, until the final record 110 is reached, and a final timestamp is assigned thereto. In this way, each pair of consecutive timestamps may be separated by the timestamp interval.

A load completion time at which the database loading process completes may be determined (206). For example, the time comparator 142 of FIG. 1 may monitor various loading operations conducted by the load manager 102, such as sorting operations of the record sorter 126, writing operations of the tablespace writer 128, and index generation operations of the index generator 130. Alternatively, one or more of the record sorter 126, the tablespace writer 128, and the index generator 130 may generate a message(s) to the time comparator 142 upon completion of their respective operations, so that the time comparator 142 may determine a completion of the loading operation based on a latest message received.

If the load completion time occurs prior to the final timestamp, a wait time until a batch completion time may be determined by comparing the load completion time and the final timestamp, and waiting for the wait time may occur until the batch completion time is reached (208). For example, the wait manager 144 may calculate the wait time as the difference between the load completion time and the final timestamp, and then the final timestamp and the batch completion time will be equivalent, or substantially equivalent.

If the load completion time is at or after the final timestamp, the batch completion time may be reached at the load completion time (210). For example, the wait manager 144 may designate that no further wait is required following the load completion time, so that the load completion time and the batch completion time will be equivalent, or substantially equivalent.

Figure 3:
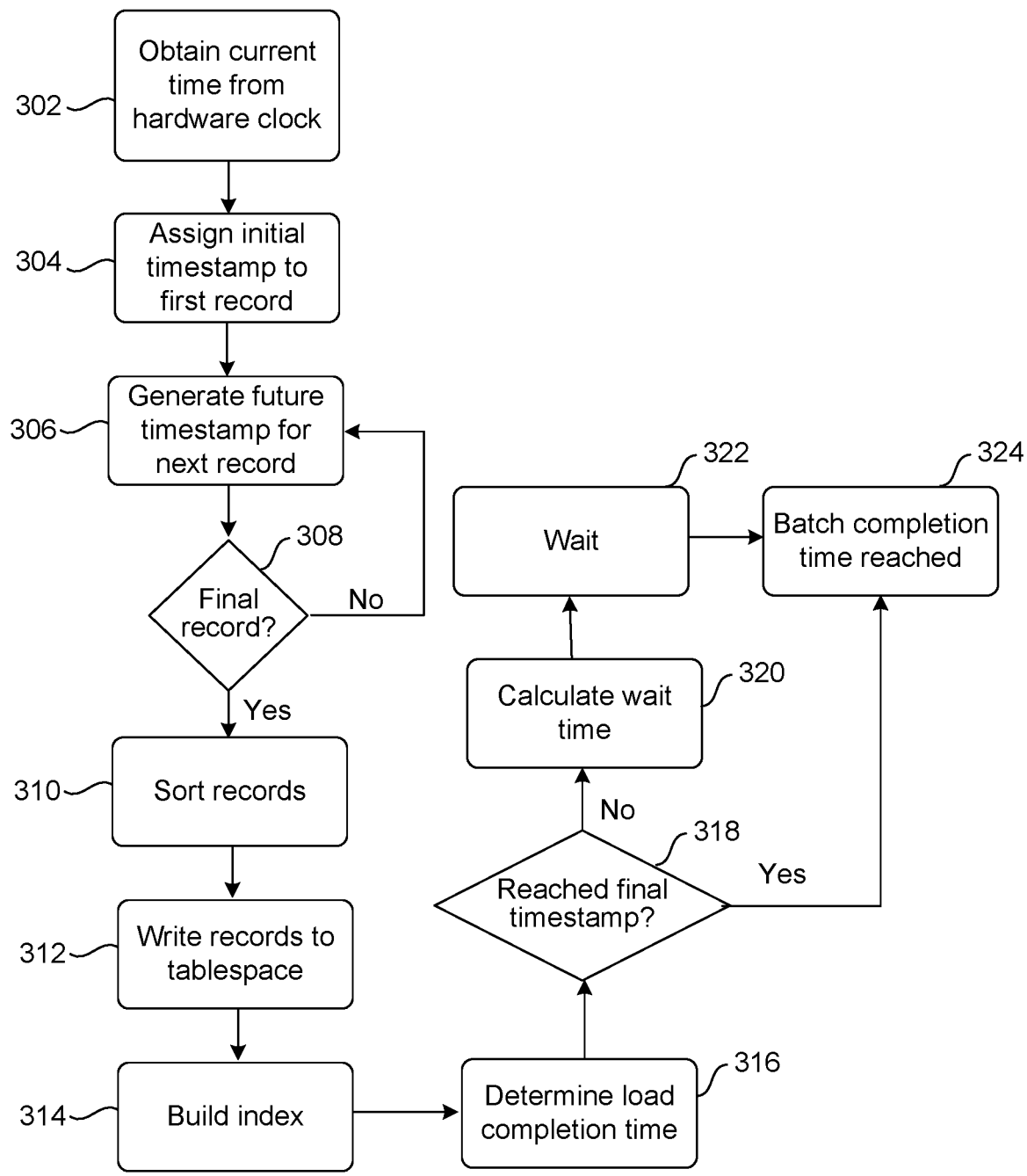
FIG. 3 is a flowchart illustrating more detailed example operations of the system of FIG. 1 when implemented for a single batch of records.

FIG. 3 is a flowchart illustrating more detailed example operations of the system of FIG. 1 when implemented for a single batch of records. In the example of FIG. 3, a current time is obtained from a hardware clock (302). Then, using the obtained current time, an initial timestamp is assigned to a first record of the batch of records being processed (304), e.g., to the first record 106. The initial timestamp may further be used to generate a future timestamp for the next record (306), e.g., the second record 108.

For example, the hardware clock 120 of FIG. 1 may represent a Time of Day (ToD) clock, which provides a counter that is incremented in hardware at a very high speed, such as every picosecond. The count may be output as a 64-bit unsigned integer that provides a binary representation of the time of day at each nanosecond, or at smaller clock units. In other words, at every picosecond (or other counter increment unit), the counter is incremented.

In the example, a bit of the 64-bit unsigned integer that corresponds to a microsecond interval would be bit 51. Therefore, to reach a time value at a granularity of a microsecond, a STCK instruction may be issued to the ToD clock to obtain the 64-bit unsigned integer, which may then be converted to a 51-bit integer by removing bits 52-63. Performing this shift of 12 bits requires the equivalent of dividing by 4096 to obtain the integer in units of microseconds, which may then be divided by 1 million to obtain a quotient in units of seconds with a remainder in units of microseconds. The remainder in microseconds may be saved, while the integer may then be divided by 60 to obtain the seconds value, and so on until the entire time value is obtained, including addition operations between values of the time at each level of granularity (e.g., microseconds plus seconds plus minutes plus hours plus days plus months plus years), at which point the time value is converted from integer format to a time-of-day format. Further operations or conversions may be required, such as adding the obtained time to a reference data of Jan. 1, 1900, and/or converting to a current time zone.

The above example illustrates that the reading and converting of the current time from the ToD clock is an expensive operation in terms of CPU time. In conventional methods of assigning timestamps, some or all of the above operations or similar may be performed many times, e.g., at least as many times as a number of timestamps required. For example, as referenced above, one conventional method is to perform at least some of the above operations repetitively until a 1 microsecond interval is observed (e.g., until bit 51 increments). In other example implementations, a 1 microsecond wait command is issued following a first clock reading so that a subsequent clock reading occurs in conjunction with a corresponding increment of bit 51. In either case, as already referenced, the above operations are performed in whole or in part for every timestamp of every record, in conjunction with occurrence of the corresponding time being reached by the ToD clock (e.g., when bit 51 actually increments).

In contrast, as described above and illustrated in FIG. 3, the operations of obtaining a current time from the ToD clock (302), at the occurrence of that time, may be performed only once for the entire batch of records (106, 108, 110) being processed, to obtain an initial timestamp. After assigning that initial timestamp to the first record 106 (304), the generation of a future timestamp for a subsequent record (306), e.g., for the second record 108, may be executed as a simple increment or addition operation(s) to obtain the future timestamp, without waiting for the time of the generated future timestamp to be reached.

For example, the future timestamp may be generated by simply incrementing bit 51 within the 64-bit integer obtained from the ToD clock and then converting the result to a time of day. In other examples, the time of day obtained for the initial timestamp may itself be incremented by 1 microsecond to obtain the next timestamp in the series. In either case, or in other implementations, the future timestamps are obtained without waiting for the actual time values of the generated timestamps to be reached by the ToD clock and with minimal demand on processor resources or time.

Thus, if the next record for which the future timestamp is generated is not the final record (308), subsequent future timestamps may be generated (306) until the final record 110 is reached (308). In some example implementations, each future timestamp may be generated and assigned iteratively until a final record is reached. In other implementations, all (n−1) timestamps may be generated and then assigned to corresponding records from a second record to a final record.

At this point, as described, various other loading operations may proceed, such as sorting the records (310) using the generated timestamps, writing the records to a relational database table of a corresponding tablespace (312), and/or building one or more indexes using the assigned timestamps (314).

As already referenced above, operations (310-314) are representative, non-limiting examples of loading operations that may occur as part of an overall batch loading process. In general, such load processes may require disk input/output (I/O) operations, which are normally measured in units of milliseconds. In some examples, a trigger to generate a unique timestamp during the load process is to define a unique index on an existing timestamp column of a database (e.g., the relational database 114), while not providing any value(s) in the timestamp field in the file(s) being loaded.

In example implementations, index building may require sorting, and the index can be defined such that the timestamp can be ascending or descending. When timestamps are generated in an ascending manner, sorting may not be required. On the other hand, sorting overhead may increase if the index is defined, e.g., as descending collating sequence, in which case, the last record generated will be sorted to appear as the first record (lowest key value) in the index.

Moreover, as may be appreciated from the above description and from the below description of FIG. 4, it may be desired to merge an index being built with prior index values from prior loading processes. Still further, many indexes may exist on various database columns, and each index may require a sort and an index build operation(s). In some cases, the data records may be required to be sorted based on a criteria different than sequential position in the input file.

The accumulated savings of microseconds during the timestamp assignment operations (302-308) may be used to reduce the time of the disk I/O in the various operations referenced above. However, e.g., if disk I/O operations occur faster than a granularity of a desired timestamp, then there may be no elapsed time savings from the generation of future timestamps, compared to conventional techniques (although processing resources may be conserved). In other words, described techniques take advantage of scenarios in which disk I/O is slower than a microsecond (or other timestamp interval being used).

Therefore, in FIG. 3, a load completion time is determined (316) that corresponds to completion of the various disk I/O operations just referenced. If the load completion time has not reached a time value of the final timestamp (318), then a wait time may be calculated (320), e.g., as a difference between the load completion time and the final timestamp.

Following completion of a calculated wait time (322), the batch completion time may be reached (324) and the loading process for the batch of records may be completed (324), e.g., the application 104 of FIG. 1 may be restarted. If the load completion time has reached the time value of the final timestamp (318), then the batch completion time may be reached at that point (324).

Put another way, the batch completion time may be defined as a maximum of either the final timestamp value or a time at which the loading operations (including disk I/O operations) are completed. In this way, as referenced above and described in more detail below with respect to FIG. 4, uniqueness of timestamps and associated records may be maintained across all loaded records. For example, without using the wait time of FIG. 3, the loading process might proceed to assign a timestamp to a first record of a subsequent batch of records being loaded that occurs prior to the final timestamp of the preceding batch, which may therefore result in a duplicate timestamp across two different records.

In some implementations of FIG. 3, the timestamp interval may be initially selected or designed to minimize or eliminate the wait time (320, 322). For example, if the timestamp interval is 1 microsecond in a first iteration of FIG. 3 and results in a wait time of 1 hour, then in a second iteration of FIG. 3 the timestamp interval may be reduced to 0.5 microseconds, or other suitable value that may be obtained by incrementing the initial timestamp by a desired quantity. In this way, a final future timestamp may be more likely to be reached by the load completion time (316), so that the requirement to wait for a batch completion time to be determined is reduced or eliminated. Optimization of the timestamp interval may be performed heuristically, or an optimal timestamp interval may be calculated based on various factors such as number of records n, quantity of sorting operations, and/or number and size of index(es) to be built.

Figure 4:
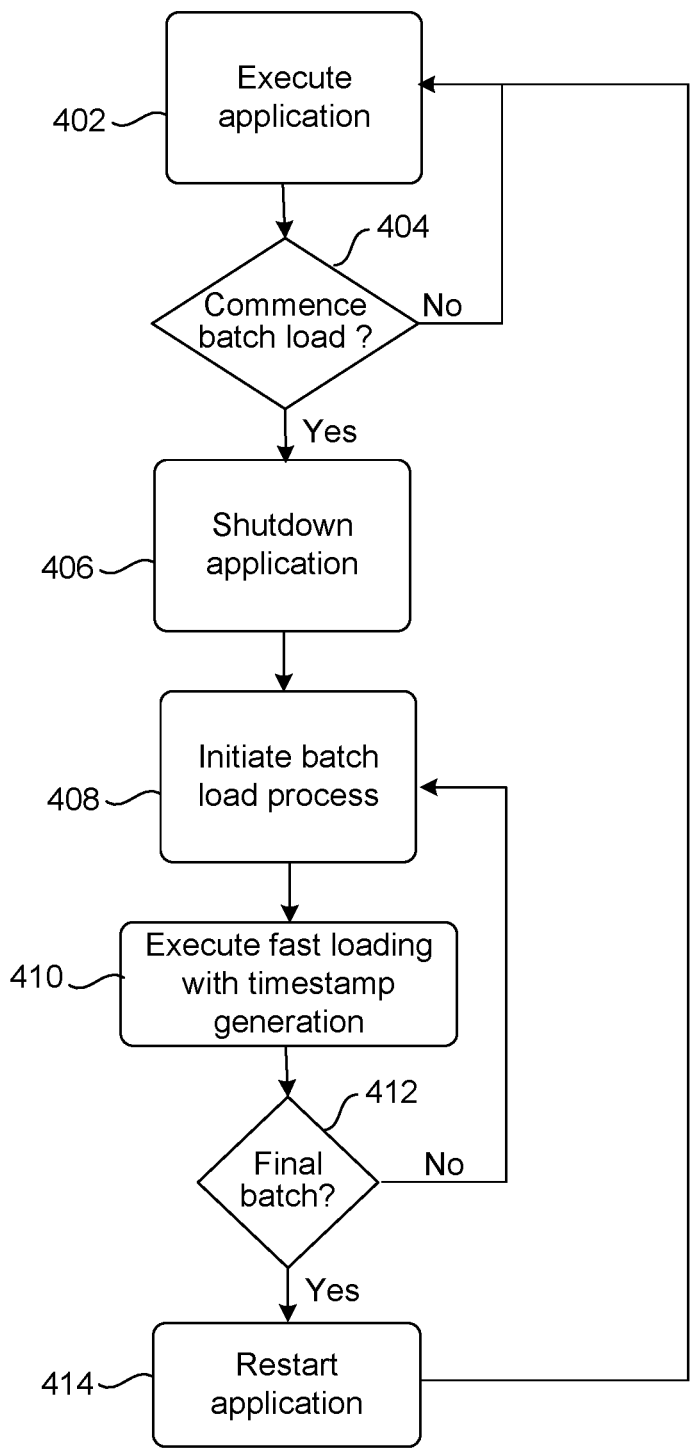
FIG. 4 is a flowchart illustrating more detailed example operations of the system of FIG. 1 when implemented for multiple batches of records.

FIG. 4 is a flowchart illustrating more detailed example operations of the system of FIG. 1 when implemented for multiple batches of records. In FIG. 4, the application 104 of FIG. 1 is executing (402) and continues to execute until a batch load is commenced (404).

Upon commencement of a first batch load, the application is shut down (406) at a beginning of the batch load process (408). Fast loading of the batch of records with timestamp generation may then be executed during a discrete execution time window (410), e.g., as described above with respect to FIG. 3. If the loaded batch is not a final batch ready for loading (412), then the next batch may proceed to be loaded (408, 410), without restarting the application.

However, if no other batches are ready for loading (412), then the application may be restarted (414). The application may continue to be executed (402) until another batch of records is ready for loading.

FIG. 4 illustrates that multiple batches of records may be loaded over time, with various pauses of execution of the application 104, as needed. As referenced above, it may be required to maintain uniqueness of timestamps across all such loading processes. In other words, for example, a final timestamp of a first batch may be required to be prior to a first timestamp of a second batch. In this way, for example, each assigned timestamp exists in both a corresponding row in the relational database as well as in at least one index, to maintain a one-to-one mapping between each row and its index value. The index may thus serve as a protection mechanism to maintain uniqueness of records in the relational database, in addition to providing an efficient method of responding to a received query.

Other techniques may be used to maintain uniqueness of timestamps and records than those described in FIGS. 3 and 4. For example, it may be possible to initiate a second or subsequent batch loading process even prior to when a future timestamp value of a first batch loading process is reached. For example, a first timestamp of the second batch loading process may be incremented from the final timestamp of the first batch loading process that would maintain uniqueness of timestamp values while also reducing a need to obtain the first timestamp value of the second batch from the ToD clock.

For example, in FIGS. 3 and 4, if a final timestamp has not been reached (318), then it may be possible to increment from the final timestamp and store the resulting timestamp to be used as a first timestamp of a second batch in the context of the iterations of FIG. 4.

In some implementations, such an approach may accumulate a total delay or wait time across two or more iterations of batch loading processes, so that waiting a necessary amount of time may be required. In other implementations, however, variations in disk I/O time and times needed for loading processes during second and later iterations may reduce the aggregate wait time across multiple batch loading iterations.

Uniqueness of data records achieved using timestamps as described herein may be utilized in other scenarios than in the context of record sorting or indexing. For example, in a manufacturing context, any item that is produced may be assigned a time-based serial number that may also be printed on the item during or after production, e.g., as the item exits an assembly line. In such example, a date and time of manufacturing may be encoded in the serial number of each item. Further, a file of the produced items may be provided for loading into a production database that stores all of the produced items uniquely.

Conventional database management systems include techniques and capabilities for loading application data into database tables. Many such conventional techniques, however, are relatively slow and time-consuming. Moreover, as quantities of data to be loaded increase, e.g., into the billions of records to be loaded during a single loading process, delays associated with conventional loading processes become longer, more inconvenient, and more unacceptable. In contrast, as described above, a database loading process is conducted in which interactions with a hardware clock (and associated operations and delays) are minimized and timestamps for records being loaded are automatically generated with future time values, without waiting to receive those timestamp values from a hardware clock when the actual time values are reached. In this way, the timestamp generation process may occur quickly and with minimal use of resources and has advantages over conventional systems that are relatively slow and time-consuming in that large quantities of data are processed, e.g., billions of records are loaded during a single loading process, minimizing delays associated with conventional loading processes.

Implementations of the various techniques described herein may be implemented in digital electronic circuitry or in computer hardware, firmware, software, or in combinations of them. Implementations may be implemented as a computer program product, i.e., a computer program tangibly embodied in an information carrier, e.g., in a machine-readable storage device, for execution by, or to control the operation of, data processing apparatus, e.g., a programmable processor, a computer, or multiple computers. A computer program, such as the computer program(s) described above, can be written in any form of programming language, including compiled or interpreted languages, and can be deployed in any form, including as a stand-alone program or as a module, component, subroutine, or other unit suitable for use in a computing environment. A computer program can be deployed to be executed on one computer or on multiple computers at one site or distributed across multiple sites and interconnected by a communication network.

Method steps may be performed by one or more programmable processors executing a computer program to perform functions by operating on input data and generating output. Method steps also may be performed by, and an apparatus may be implemented as, special purpose logic circuitry, e.g., an FPGA (field programmable gate array) or an ASIC (application-specific integrated circuit).

Processors suitable for the execution of a computer program include, by way of example, both general and special purpose microprocessors and any one or more processors of any kind of digital computer. Generally, a processor will receive instructions and data from a read-only memory or a random access memory or both. Elements of a computer may include at least one processor for executing instructions and one or more memory devices for storing instructions and data. Generally, a computer also may, or be operatively coupled to, receive data from or transfer data to, or both, one or more mass storage devices for storing data, e.g., magnetic, magneto-optical disks, or optical disks. Information carriers suitable for embodying computer program instructions and data include all forms of non-volatile memory, including by way of example semiconductor memory devices, e.g., EPROM, EEPROM, and flash memory devices; magnetic disks, e.g., internal hard disks or removable disks; magneto-optical disks; and CD-ROM and DVD-ROM disks. The processor and the memory may be supplemented by or incorporated in special purpose logic circuitry.

To provide for interaction with a user, implementations may be implemented on a computer having a display device, e.g., a cathode ray tube (CRT) or liquid crystal display (LCD) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input.

Implementations may be implemented in a computing system that includes a back-end component, e.g., as a data server, or that includes a middleware component, e.g., an application server, or that includes a front-end component, e.g., a client computer having a graphical user interface or a Web browser through which a user can interact with an implementation, or any combination of such back-end, middleware or front-end components. Components may be interconnected by any form or medium of digital data communication, e.g., a communication network. Examples of communication networks include a local area network (LAN) and a wide area network (WAN), e.g., the Internet.

While certain features of the described implementations have been illustrated as described herein, many modifications, substitutions, changes, and equivalents will now occur to those skilled in the art. It is, therefore, to be understood that the appended claims are intended to cover all such modifications and changes as fall within the scope of the embodiments.

What is claimed is:

1. A computer program product, the computer program product being tangibly embodied on a non-transitory computer-readable storage medium and comprising instructions that, when executed by at least one computing device, are configured to cause the at least one computing device to:
   determine, for a first record of a batch of records, a first timestamp to be stored with the first record in a database into which the batch of records are to be loaded as part of a database loading process;
   generate, for each remaining record of the batch of records, a future timestamp using the first timestamp, until a final timestamp of a final record of the batch of records is generated;
   determine a load completion time at which the database loading process completes;
   if the load completion time occurs prior to the final timestamp, determine a wait time until a batch completion time by comparing the load completion time and the final timestamp, and wait for the wait time to reach the batch completion time; and
   if the load completion time is at or after the final timestamp, reach the batch completion time at the load completion time.

2. The computer program product of claim 1, wherein the instructions are further configured to cause the at least one computing device to:
   determine the first timestamp by issuing a command for a current time value to a hardware clock of at least one processor of the at least one computing device.

3. The computer program product of claim 1, wherein the instructions are further configured to cause the at least one computing device to:
   generate a second timestamp for a second record of the batch of records by adding a second timestamp to the second record having a time value that is incremented from the first timestamp by a timestamp interval.

4. The computer program product of claim 3, wherein the instructions are further configured to cause the at least one computing device to:
   assign remaining timestamps to the remaining records of the batch of records, including the final timestamp, with each pair of consecutive timestamps separated by the timestamp interval.

5. The computer program product of claim 3, wherein the timestamp interval is selected to minimize or eliminate the wait time.

6. The computer program product of claim 1, wherein the instructions are further configured to cause the at least one computing device to:
   execute, as part of the database loading process and following assignment of timestamps including the first timestamp and the future timestamps to respective records of the batch of records, a sorting operation that sorts records of the batch of records using the timestamps.

7. The computer program product of claim 1, wherein the instructions are further configured to cause the at least one computing device to:

execute, as part of the database loading process and following assignment of timestamps including the first timestamp and the future timestamps to respective records of the batch of records, an indexing operation that indexes the batch of records using the timestamps.

8. The computer program product of claim 1, wherein the instructions are further configured to cause the at least one computing device to:
shut down an application from which the batch of records are received at a beginning of the database loading process; and
restart the application when the batch completion time is reached.

9. The computer program product of claim 8, wherein the instructions are further configured to cause the at least one computing device to:
shut down the application to initiate a second database loading process of a second batch of records received from the application following the restart of the application; and
assign second timestamps to respective records of the second batch of records, including a first timestamp of a first record of the second batch of records that occurs after the final timestamp of the final record of the batch of records.

10. A computer-implemented method, the method comprising:
determining, for a first record of a batch of records, a first timestamp to be stored with the first record in a database into which the batch of records are to be loaded as part of a database loading process;
generating, for each remaining record of the batch of records, a future timestamp using the first timestamp, until a final timestamp of a final record of the batch of records is generated;
determining a load completion time at which the database loading process completes;
if the load completion time occurs prior to the final timestamp, determining a wait time until a batch completion time by comparing the load completion time and the final timestamp, and waiting for the wait time to reach the batch completion time; and
if the load completion time is at or after the final timestamp, reaching the batch completion time at the load completion time.

11. The method of claim 10, comprising:
determining the first timestamp by issuing a command for a current time value to a hardware clock of at least one processor of at least one computing device.

12. The method of claim 10, comprising:
generating a second timestamp for a second record of the batch of records by adding a second timestamp to the second record having a time value that is incremented from the first timestamp by a timestamp interval.

13. The method of claim 12, comprising:
assigning remaining timestamps to the remaining records of the batch of records, including the final timestamp, with each pair of consecutive timestamps separated by the timestamp interval.

14. The method of claim 10, comprising:
executing, as part of the database loading process and following assignment of timestamps including the first timestamp and the future timestamps to respective records of the batch of records, a sorting operation that sorts records of the batch of records using the timestamps.

15. The method of claim 10, comprising:
as part of the database loading process and following assignment of timestamps including the first timestamp and the future timestamps to respective records of the batch of records, executing an indexing operation that indexes the batch of records using the timestamps.

16. The method of claim 10, comprising:
shutting down an application from which the batch of records are received at a beginning of the database loading process; and
restarting the application when the batch completion time is reached.

17. The method of claim 16, comprising:
shutting down the application to initiate a second database loading process of a second batch of records received from the application following the restart of the application; and
assigning second timestamps to respective records of the second batch of records, including a first timestamp of a first record of the second batch of records that occurs after the final timestamp of the final record of the batch of records.

18. A system comprising:
at least one memory including instructions; and
at least one processor that is operably coupled to the at least one memory and that is arranged and configured to execute instructions that, when executed, cause the at least one processor to:
determine, for a first record of a batch of records, a first timestamp to be stored with the first record in a database into which the batch of records are to be loaded as part of a database loading process;
generate, for each remaining record of the batch of records, a future timestamp using the first timestamp, until a final timestamp of a final record of the batch of records is generated;
determine a load completion time at which the database loading process completes;
if the load completion time occurs prior to the final timestamp, determine a wait time until a batch completion time by comparing the load completion time and the final timestamp, and wait for the wait time to reach the batch completion time; and
if the load completion time is at or after the final timestamp, reach the batch completion time at the load completion time.

19. The system of claim 18, wherein the instructions are further configured to cause the at least one processor to:
determine the first timestamp by issuing a command for a current time value to a hardware clock of the at least one processor.

20. The computer program product of claim 1, wherein the instructions are further configured to cause the at least one computing device to:
generate a second timestamp for a second record of the batch of records by adding a second timestamp to the second record having a time value that is incremented from the first timestamp by a timestamp interval; and
assign remaining timestamps to the remaining records of the batch of records, including the final timestamp, with each pair of consecutive timestamps separated by the timestamp interval.

* * * * *